United States Patent
Kim et al.

(10) Patent No.: US 9,058,953 B2
(45) Date of Patent: Jun. 16, 2015

(54) MANUFACTURING METHOD OF A FLAT PANEL DISPLAY DEVICE

(75) Inventors: Younghoon Kim, Goyang-si (KR); Joongmin Yoon, Paju-si (KR); Incheol Park, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 26 days.

(21) Appl. No.: 12/974,712

(22) Filed: Dec. 21, 2010

(65) Prior Publication Data

US 2011/0159769 A1 Jun. 30, 2011

(30) Foreign Application Priority Data

Dec. 28, 2009 (KR) .................. 10-2009-0131982

(51) Int. Cl.
*H01J 9/22* (2006.01)
*H01J 9/227* (2006.01)
*G02F 1/1335* (2006.01)
*G02F 1/1339* (2006.01)

(52) U.S. Cl.
CPC ........... *H01J 9/227* (2013.01); *G02F 1/133512* (2013.01); *G02F 1/133516* (2013.01); *G02F 1/13394* (2013.01)

(58) Field of Classification Search
CPC ................. G02F 1/13394; G02F 1/133512
USPC ........................................................ 445/24
See application file for complete search history.

(56) References Cited

U.S. PATENT DOCUMENTS

| 5,680,187 A * | 10/1997 | Nagayama et al. ........... 349/110 |
| 6,097,467 A | 8/2000 | Fujimaki et al. |
| 2003/0107314 A1* | 6/2003 | Urabe et al. .................. 313/506 |
| 2003/0128311 A1 | 7/2003 | Tsuda |
| 2005/0162600 A1* | 7/2005 | Rho et al. ...................... 349/139 |

FOREIGN PATENT DOCUMENTS

| KR | 1998-0018383 | 6/1998 |
| KR | 10-1998-0025016 | 7/1998 |
| KR | 10-0156655 | 11/1998 |
| KR | 10-2006-0057196 | 5/2006 |

* cited by examiner

*Primary Examiner* — Nimeshkumar Patel
*Assistant Examiner* — Jacob R Stern
(74) *Attorney, Agent, or Firm* — McKenna Long & Aldridge LLP

(57) ABSTRACT

Disclosed is a manufacturing method for a spacer in a flat panel display device. The method comprises forming a color filter substrate including: defining pixel areas on a transparent substrate; forming black matrixes surrounding the pixel areas; forming a first color filter in a first area, and a first pigment layer having a first width on a spacer area in the black matrixes by depositing and patterning a first pigment on the substrate; forming a second color filter in a second area, and a second pigment layer having a second width on the spacer area in the black matrixes by depositing and patterning a second pigment on the substrate; and forming a third color filter in a third area, and a third pigment layer having a third width on the spacer area in the black matrixes by depositing and patterning a third pigment on the substrate.

6 Claims, 5 Drawing Sheets

MANUFACTURING METHOD OF A FLAT PANEL DISPLAY DEVICE

This application claims the benefit of Korea Patent Application No. 10-2009-0131982 filed on Dec. 28, 2009, which is incorporated herein by reference for all purposes as if fully set forth herein.

BACKGROUND OF THE INVENTION

1. Field of the Invention

The present disclosure relates to a manufacturing method of a flat panel display device. Especially, the present disclosure relates to a manufacturing method for a spacer to maintain cell gap evenly using color filters in a flat panel display device such as a liquid crystal display device.

2. Discussion of the Related Art

Nowadays, due to the characteristics of light weight, slim thickness, low consumption electric power, the liquid crystal display device (or, LCD) is widely applied more and more. Especially, an active matrix type liquid crystal display device (or "AMLCD") represents video data using the thin film transistor (or "TFT") as the switching element. As the AMLCD can be made in thin flat panel with lightening weight, nowadays in the display device market, it is replacking cathode ray tube (or "CRT") and applied to the portable computer such as note book PC, the official automation devices, the audio/video devices and so on.

Due to the remarkable development of the manufacturing processes and driving technologies for the liquid crystal display device, the cost for manufacturing it is getting lower and lower, the quality of it is enhance more and more. However, it is still required to develop the LCD in the aspects of the consumption power, video quality and manufacturing cost in order to comply with the customer's requirement.

SUMMARY OF THE INVENTION

In order to overcome the above mentioned drawbacks, the purpose of the present disclosure is to suggest a method for manufacturing a liquid crystal display device without any separated manufacturing process for a spacer in which the cell gap of the liquid crystal display device is maintained evenly. Another purpose of the present disclosure is to suggest a manufacturing method of a liquid crystal display device in which the space is formed when the color filter is formed. Still another purpose of the present disclosure is to suggest a manufacturing method of a liquid crystal display device in which spacers having various heights are simultaneously formed to maintain the cell gap of the liquid crystal display device evenly by using CD loss of the different width of a stacked color filter layers.

In order to accomplish the above purpose, the present disclosure suggests a manufacturing method of a flat panel display device comprising: forming a color filter substrate including: defining pixel areas on a transparent substrate; forming black matrixes surrounding the pixel areas; forming a first color filter in a first area among the pixel areas, and a first pigment layer having a first width on a spacer area in the black matrixes, by depositing and patterning a first pigment on the substrate; forming a second color filter in a second area among the pixel areas, and a second pigment layer having a second width on the spacer area in the black matrixes, by depositing and patterning a second pigment on the substrate; and forming a third color filter in a third area among the pixel areas, and a third pigment layer having a third width on the spacer area in the black matrixes, by depositing and patterning a third pigment on the substrate.

At least two of the first width, the second width and the third width are simultaneously same.

At least one of the first width, the second width and the third width has different width from other width.

The method further including: depositing an over coat layer on the color filters and the pigment layers.

The method further comprising: forming a thin film transistor substrate having a plurality of thin film transistor; and facing the thin film transistor substrate with the color filter substrate by inserting a liquid crystal layer therebetween, and joining the thin film transistor substrate and the color filter substrate by maintaining a cell gap.

Because that the manufacturing method of the liquid crystal display device forms spacers without any separated manufacturing process of the spacers, the process is simplifized and the cost is lowered as well. Furthermore, by controlling the width of the color pigment layers for spacer, it is possible to make various heights of spacer due to the CD loss. Therefore, according to the present disclosure, spacers having various heights are simultaneously formed and the cost for manufacturing would be further reduced.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
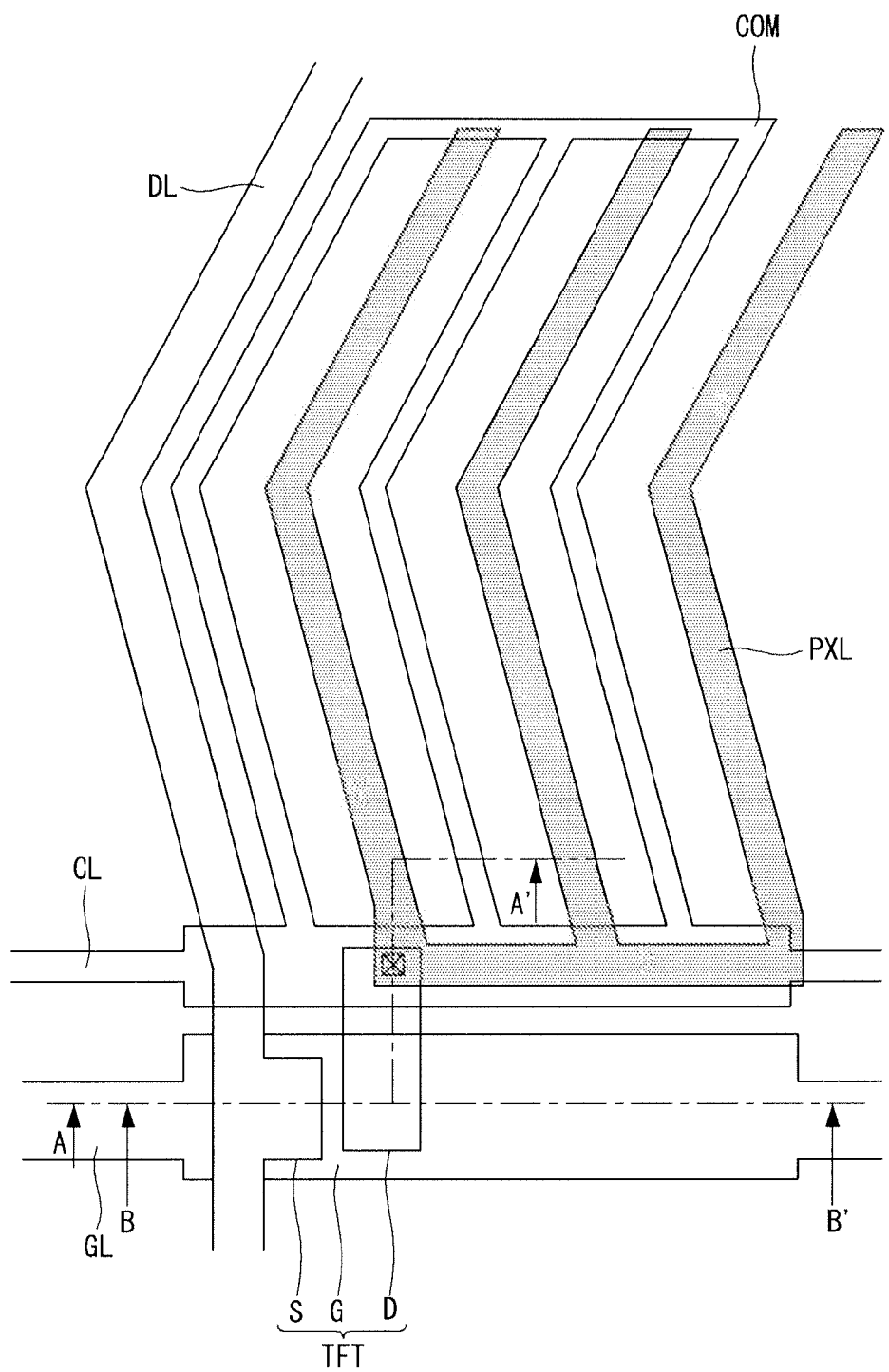
FIG. 1 is a plan view illustrating the structure of a liquid crystal display device according to the present disclosure.
Figure 2:
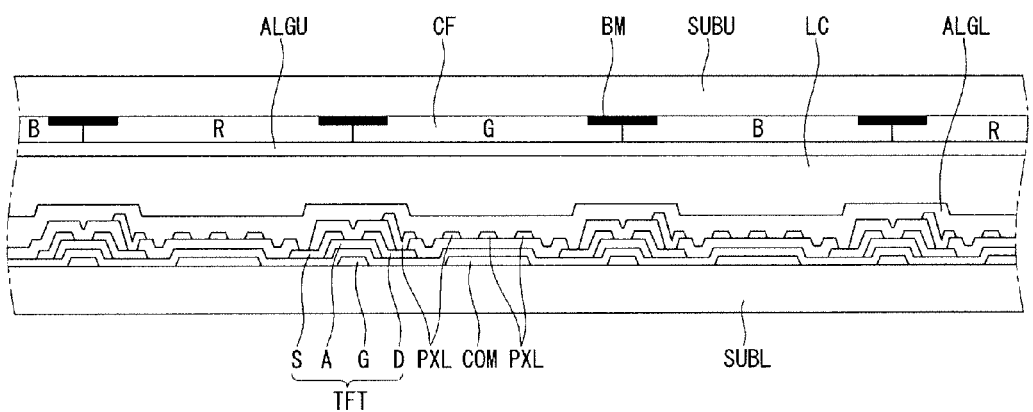
FIG. 2 is a cross-sectional view illustrating the structure of the liquid crystal display device by cutting along the line I-I'.

Referring to attached figures, preferred embodiments will be explained. FIG. 1 is a plan view illustrating the structure of a liquid crystal display device according to the present disclosure. FIG. 2 is a cross-sectional view illustrating the structure of the liquid crystal display device by cutting along the line I-I'.

Referring to FIGS. 1 and 2, the liquid crystal display device includes a structure in which a thin film transistor substrate TFTS and a color filter substrate CFS joined with each other having a liquid crystal layer LC disposed therebetween. The thin film transistor substrate TFTS comprises a thin film transistor disposed in each pixel area designed in matrix array on a transparent substrate. The color filter substrate CFS comprises a color filter CF selected one of red, green and blue pigments in each pixel area.

In the thin film transistor substrate TFTS, a plurality of gate line GL running in horizontal direction and a plurality of data line DL running in vertical direction are disposed on the lower transparent substrate SUBL to defined a plurality of pixel area. In each pixel area, a common electrode COM is formed. In addition, at one corner of the pixel area, included is a thin film transistor TFT having a gate electrode G branched from the gate line GL, a semiconductor layer A overlapping with the gate electrode G over a gate insulating layer GI covering the gate electrode G, a source electrode S branched from the data line DL and contacting one side of the semiconductor layer A, and a drain electrode D facing with the source electrode S and contacting the other side of the semiconductor layer A. On the thin film transistor TFT, a passivation layer PASI is deposited, and a pixel electrode PXL is formed on the passivation layer PASI. The pixel electrode PXL is connected to the drain electrode D of the thin film transistor TFT. Especially, the pixel electrode PXL is formed in a plurality of segments to form a horizontal electric field with the common electrode COM. On the top layer of the thin film transistor substrate TFTS, a lower alignment layer ALGL is formed.

The color filter substrate CFS comprises a black matrix BM surrounding the pixel area on a upper transparent substrate SUBU. In the pixel area defined by the black matrix BM, a color filter CF including any one of red (R), green (G), and blue (B) pigments is formed. The series of color filters CF are disposed in R-G-B array. On the color filter CF, an upper alignment layer ALGU is formed.

The above mentioned color filter substrate CFS is used for the horizontal electric field type liquid crystal display device. In the vertical electric field type liquid crystal display device, the common electrode COM is formed on the color filter substrate CFS to face with the pixel electrode PXL formed on the thin film transistor substrate TFTS. In this case, the thin film transistor layer TFTS does not have the common electrode COM.

The thin film transistor substrate TFTS and the color filter substrate CFS are faced and joined each other having a liquid crystal layer LC therebetween. The cell gap of the liquid crystal layer LC should be maintained a substantially equal thickness overall joined substrates. In order to maintain the cell gap evenly, a plurality of spacers SP would be formed in the areas having not pixel electrode PXL. Preferably, the spacer SP would be formed where the black matrix BM is formed.

The spacer SP may be formed on the thin film transistor substrate TFTS. However, in the present disclosure, the spacer SP would be preferably formed on the color filter substrate CFS. Referring to FIGS. 3A to 3E, the manufacturing processes for making the color filter substrate according to the present disclosure will be explained. FIGS. 3A to 3E are cross-sectional views illustrating a manufacturing process of the color filter substrate including the space according to the present disclosure.

Figure 3A:
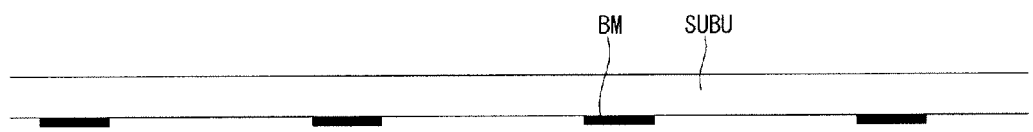
FIGS. 3A to 3E are cross-sectional views illustrating a manufacturing process of the color filter substrate including the space according to the present disclosure.

Referring to FIG. 3A, on an upper transparent substrate SUBU, a black matrix BM surrounding the pixel area is formed.

Figure 3B:
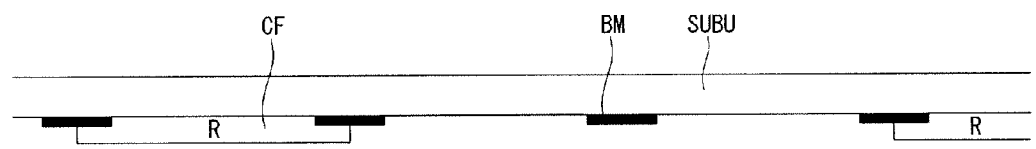

Referring to FIG. 3B, a red pigment is coated on the all surface of the upper substrate SUBU having the black matrix BM. By patterning the red pigment, a red color filter CFR is formed in required areas. At this time, a spacer layer SP (show in FIG. 3E) having the red pigment layer SPR at the area where the spacer SP would be formed on the black matrix BM. Here, the red pigment layer SPR has a first width.

Figure 3C:
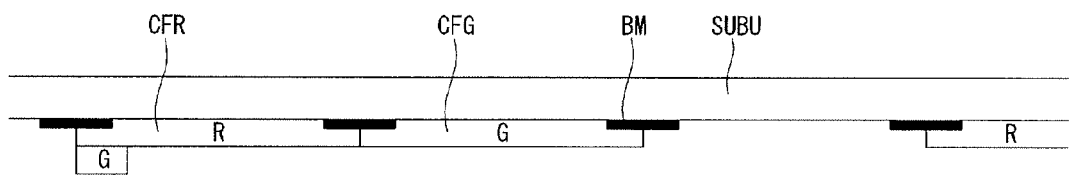

Referring to FIG. 3C, on the upper substrate SUBU having the red color filter CFR and a red pigment layer SPR, a green pigment is disposed. By patterning the green pigment, a green color filter CFG is formed in required areas. At this time, a spacer layer SP (show in FIG. 3E) having the green pigment layer SPG at the area where the spacer SP would be formed on the black matrix BM and the red pigment layer SPR. Here, the green pigment layer SPG has a second width.

Figure 3D:
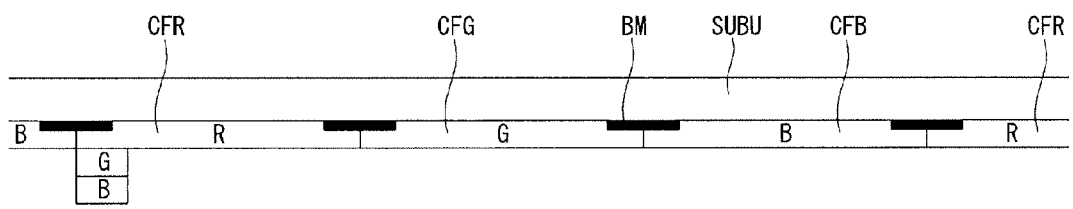

Referring to FIG. 3D, on the upper substrate SUBU having the red color filter CFR and a green color filter CFG, a blue pigment is disposed. By patterning the blue pigment, a blue color filter CFB is formed in required areas. At this time, a spacer layer SP (show in FIG. 3E) having the blue pigment layer SPB at the area where the spacer SP would be formed on the black matrix BM, the red pigment layer SPR, and the green pigment layer SPG. Here, the blue pigment layer SPB has a third width.

Figure 3E:
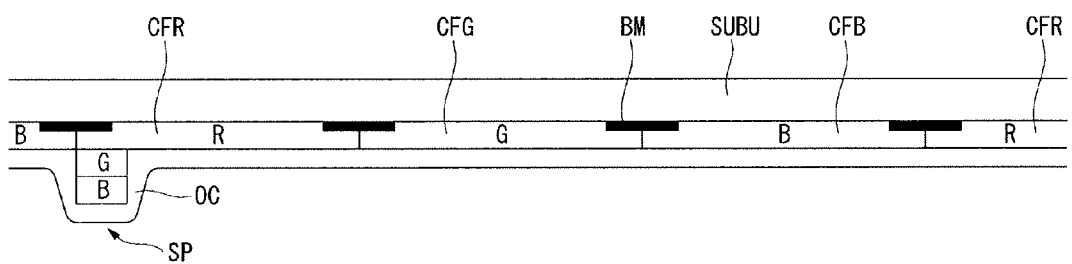

Referring to FIG. 3E, on the upper substrate SUBU having the red, green and blue color filters CFR, CFG and CFB and the spacer SP, an over coat layer OC is deposited. Therefore, the spacer SP has a stacked structure including the black matrix BM, the red pigment layer SPR, the green pigment layer SPG, the blue pigment layer SPB, and the over coat layer OC. Furthermore, the spacer SP is simultaneously formed when the color filter layer CFL is completed. Even though the spacer SP includes the black matrix BM, the red pigment layer SPR, the green pigment layer SPG the blue pigment layer SPB, and the over coat layer OC, the protruded portion of the spacer SP actually works as the spacer SP for maintaining the cell gap between the thin film transistor substrate TFTS and the color filter substrate CFS. Therefore, without any additional processes, the spacer SP is completed so that the manufacturing process is simplified and the manufacturing cost is cheap.

In the process for manufacturing the spacer on the color filter substrate CFS without additional processing step, the widths of the red, green, and blue pigment layers SPR, SPG and SPB can be varied to control the height of the spacer SP. That is, using the CD loss occurring during the etching process, the height of the spacer SP can be freely controlled.

Figure 4:
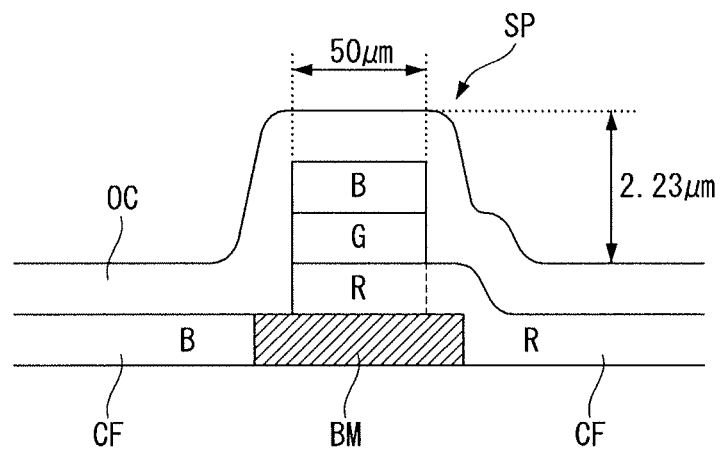
FIG. 4 is a diagram illustrating the spacer simultaneously formed with the color filter CF according to the first embodiment of the present disclosure.

For one example, as shown in FIG. 4, the red pigment layer SPR, the green pigment layer SPG and the blue pigment layer SPB can be stacked to have the same widths of 50 μm, and the over coat layer OC can be deposited with 2.0 μm thickness. Then, the height of the spacer SP, especially protruded portion, will be 2.23 μm thickness. At depositing step, each pigment is coated with the same thickness of the color filter CF, 5 μm, but after patterning each pigment layer, the total stacked layer has 2.23 μm thickness. FIG. 4 is a diagram illustrating the spacer simultaneously formed with the color filter CF according to the first embodiment of the present disclosure.

Figure 5:
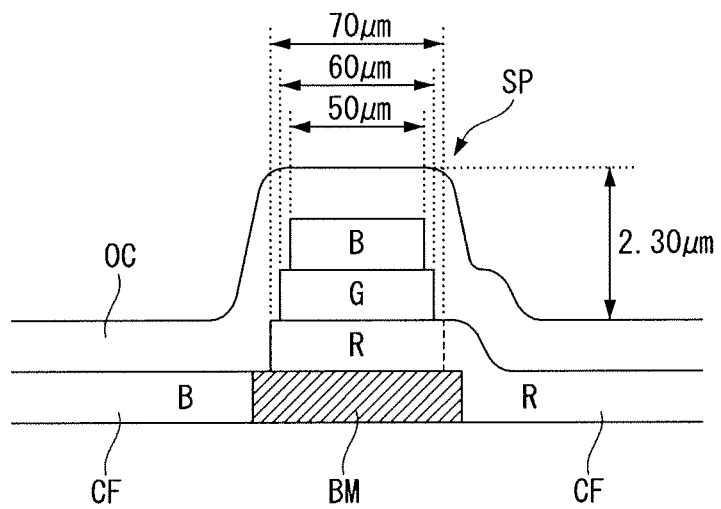
FIG. 5 is a diagram illustrating the spacer simultaneously formed with the color filter CF according to the second embodiment of the present disclosure.

In another example, as shown in FIG. 5, the red pigment SPR having width of 70 μm, the green pigment SPG having width of 60 μm, and the blue pigment SPB having width of 50 μm can be stacked and then the over coat layer OC can be deposited with a width of 2.0 μm. Then, the height of the spacer SP, especially protruded portion, will be 2.30 μm thickness. At depositing step, each pigment is coated with the same thickness of the color filter CF, 5 μm, but after patterning each pigment layer, the total stacked layer has 2.30 μm thickness. FIG. 5 is a diagram illustrating the spacer simultaneously formed with the color filter CF according to the second embodiment of the present disclosure.

Figure 6:
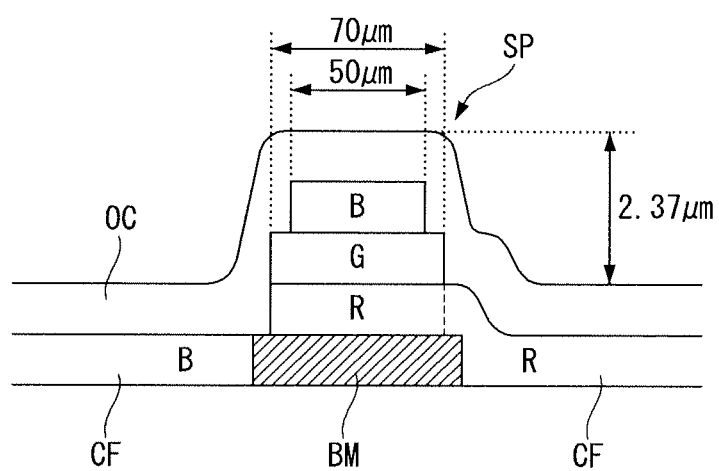
FIG. 6 is a diagram illustrating the spacer simultaneously formed with the color filter CF according to the third embodiment of the present disclosure.

In still another example, as shown in FIG. 6, the red pigment SPR and the green pigment SPG having width of 60 μm in each, and the blue pigment SPB having width of 50 μm can be stacked and then the over coat layer OC can be deposited with a width of 2.0 μm. Then, the height of the spacer SP, especially protruded portion, will be 2.37 μm thickness. At depositing step, each pigment is coated with the same thickness of the color filter CF, 5 μm, but after patterning each pigment layer, the total stacked layer has 2.37 μm thickness. FIG. 6 is a diagram illustrating the spacer simultaneously formed with the color filter CF according to the third embodiment of the present disclosure.

In addition to above mentioned examples, the spacer SP can be manufactured to have various shapes such as cylinder, stick or rectangular column so that it is possible to control the height of the spacer SP, because it is possible to get different height after patterning in different shape even if it is deposited with a same height. Furthermore, varying the thickness of the over coat layer OC, the height of the spacer SP can be controlled, too. Following Table 1 shows various heights of the spacer SP according to the widths of the red, green and blue pigment layers SPR, SPG and SPB, the thickness of the over coat layer OC, and the shape of the spacer SP.

TABLE 1

| Shape of Spacer | Thickness of Overcoat | Width of SPR | Width of SPG | Width of SPB | (Unit: μm) Height of Spacer |
|---|---|---|---|---|---|
| Cylindrical Shape | 2.0 | 70 | 70 | 50 | 2.37 |
|  | 1.8 | 70 | 70 | 50 | 2.27 |
| Cylindrical Shape | 2.0 | 70 | 60 | 50 | 2.30 |
|  | 1.8 | 70 | 60 | 50 | 2.20 |
| Cylindrical Shape | 2.0 | 50 | 50 | 50 | 2.25 |
|  | 1.8 | 50 | 50 | 50 | 2.15 |
| Rectangular Column Shape | 2.0 | 60 | 60 | 50 | 2.42 |
|  | 1.8 | 60 | 60 | 50 | 2.32 |
| Rectangular Column Shape | 2.0 | 50 | 50 | 50 | 2.23 |
|  | 1.8 | 50 | 50 | 50 | 2.13 |

As the color filter is formed in red-green-blue color sequence in the above mentioned embodiments, the spacer SP has the structure of R-G-B stacked layers. However, if the color filter forming sequence has any one of blue-red-green, green-blue-red, red-blue-green, blue-green-red, green-red-blue and red-green-blue sequence, then the spacer stacked structure can be varied according to the color filter forming sequence.

Until now, we explained about the manufacturing method of spacer simultaneously formed when the color filter is formed by focusing on the liquid crystal display device, especially horizontal electric field type liquid crystal display device. However, it is not restricted on the embodiments explained in the specification of the present disclosure, but it is possible to apply the concept of the present disclosure to any flat panel display device having any structure elsewhere it has color filters. For example, in the electroluminescent display device having color filters, it is possible to simplify the manufacturing process and to save the manufacturing cost by adopting the present disclosure.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A manufacturing method of a flat panel display device comprising:
   forming a color filter substrate including:
   defining pixel areas on a transparent substrate;
   forming black matrixes surrounding the pixel areas;
   forming a first color filter in a first area among the pixel areas, and a first pigment layer having a first width in a spacer area directly on the black matrixes, by depositing and patterning a first pigment on the color filter substrate;
   forming a second color filter in a second area among the pixel areas, and a second pigment layer having a second width on the first pigment layer, by depositing and patterning a second pigment on the color filter substrate;
   forming a third color filter in a third area among the pixel areas, and a third pigment layer having a third width on the second pigment layer, by depositing and patterning a third pigment on the color filter substrate; and
   depositing an overcoat layer having a thickness of 1.8 μm-2.0 μm on the first, second and third color filters and the first, second and third pigment layers,
   wherein a spacer is formed for maintaining a cell gap between the color filter substrate and a thin film transistor substrate, wherein the spacer has a stacked structure that includes the black matrixes, the first pigment layer, the second pigment layer, and the third pigment layer, and, wherein the spacer has a height of 2.13 μm-2.42 μm,
   wherein at least one of the first width, the second width, and the third width of the pigment layers is a width different from other widths of the pigment layers in the stacked structure to control a height of the spacer, and
   wherein a height of the first pigment layer, a height of the second pigment layer, and a height of the third pigment layer are controlled by using CD loss of the first width of the first pigment layer, the second width of the second pigment layer, and the third width of the third pigment layer, respectively.

2. The method according to the claim 1, wherein at least two widths of the first width, the second width and the third width of the pigment layers are the same.

3. The method according to the claim 1, further comprising:
   forming the thin film transistor substrate having a plurality of thin film transistors; and
   facing the thin film transistor substrate with the color filter substrate by inserting a liquid crystal layer therebetween, and joining the thin film transistor substrate and the color filter substrate by maintaining a cell gap.

4. The method according to the claim 1, wherein the first pigment is selected one of red, green and blue color pigments.

5. The method according to the claim 4, wherein the second pigment is selected one of red, green and blue color pigment, and the second pigment is different from the first pigment.

6. The method according to the claim 5, wherein the third pigment is selected one of red, green and blue color pigment, and the third pigment is different from the first and second pigments.

* * * * *